US009131558B2

(12) United States Patent
Rohde et al.

(10) Patent No.: US 9,131,558 B2
(45) Date of Patent: Sep. 8, 2015

(54) DIRECT LED LIGHTING SYSTEM AND METHOD

(75) Inventors: Sheldon Lee Rohde, Richardson, TX (US); Ramin Safavi, Plano, TX (US); Marty Masias, Tom Bean, TX (US); George Berman, Plano, TX (US); Kent Solberg, Murphy, TX (US); Valeriy K. Berger, Plano, TX (US); Dan Kelleher, Plano, TX (US); Labon Ruth, Highland Village, TX (US); John F. Barr, Garland, TX (US); Derek B. Vinson, Frisco, TX (US)

(73) Assignee: Luminator Holding LP, Plano, TX (US)

( * ) Notice: Subject to any disclaimer, the term of this patent is extended or adjusted under 35 U.S.C. 154(b) by 775 days.

(21) Appl. No.: 13/060,355

(22) PCT Filed: Aug. 25, 2009

(86) PCT No.: PCT/US2009/054963
§ 371 (c)(1),
(2), (4) Date: Jul. 28, 2011

(87) PCT Pub. No.: WO2010/027823
PCT Pub. Date: Mar. 11, 2010

(65) Prior Publication Data
US 2011/0273875 A1 Nov. 10, 2011

Related U.S. Application Data

(60) Provisional application No. 61/091,630, filed on Aug. 25, 2008.

(51) Int. Cl.
*F21V 1/00* (2006.01)
*H05B 33/08* (2006.01)
(Continued)

(52) U.S. Cl.
CPC ............ *H05B 33/0803* (2013.01); *B60Q 3/025* (2013.01); *F21V 19/001* (2013.01);
(Continued)

(58) Field of Classification Search
CPC F21Y 2101/02; B60Q 3/025; H05B 33/0803; F21V 19/007; F21V 19/001
USPC ............... 362/227, 235, 244, 249.01, 249.02, 362/257, 310, 311.01, 311.02, 326
See application file for complete search history.

(56) References Cited

U.S. PATENT DOCUMENTS 6,851,834 B2 2/2005 Leysath
7,331,689 B2 2/2008 Chen
(Continued)

FOREIGN PATENT DOCUMENTS

EP 1281574 A2 2/2003
WO WO-01/84227 A1 11/2001
WO WO-03/077013 A2 9/2003

OTHER PUBLICATIONS

Copenheaver, Blaine R., "International Search Report" for PCT/US2009/054963 as mailed Oct. 15, 2009, 2 pages.

*Primary Examiner* — Meghan Dunwiddie
(74) *Attorney, Agent, or Firm* — Winstead PC

(57) ABSTRACT

A direct lighting system and method is provided that includes a plurality of light-emitting diodes (LEDs) secured within a light fixture. The lighting system further includes a diffusive transmissive element adapted to transmit light from the LEDs therethrough and provide diffused light to an area requiring illumination.

20 Claims, 12 Drawing Sheets

(51) Int. Cl.
*B60Q 3/02* (2006.01)
*F21V 19/00* (2006.01)
*F21Y 101/02* (2006.01)
*F21Y 103/00* (2006.01)

(52) U.S. Cl.
CPC ........... *F21V19/007* (2013.01); *F21Y 2101/02* (2013.01); *F21Y 2103/003* (2013.01); *Y10T 29/49002* (2015.01)

(56) References Cited

U.S. PATENT DOCUMENTS

| | | |
|---|---|---|
| 2005/0063063 A1 | 3/2005 | Ashdown |
| 2007/0121328 A1 | 5/2007 | Mondloch et al. |
| 2007/0183156 A1 | 8/2007 | Shan |
| 2008/0273333 A1* | 11/2008 | Berns et al. .................. 362/294 |

* cited by examiner

DIRECT LED LIGHTING SYSTEM AND METHOD

CROSS-REFERENCE TO RELATED APPLICATIONS

This patent application claims priority from, and incorporates by reference for any purpose the entire disclosure of, U.S. Provisional Patent Application No. 61/091,630, filed Aug. 25, 2008.

TECHNICAL FIELD

This application relates generally to light sources and more particularly, but not by way of limitation, to direct LED lighting systems and methods for providing general ambient lighting to an area.

HISTORY OF RELATED ART

Lighting is critical in commercial-transportation vehicles. In addition to aesthetics, passenger safety and comfort must be addressed in the design of the internal lighting system. Traditionally, commercial-transportation vehicles, such as, for example, busses, trains, and planes, require illumination throughout substantially all of the internal space of the vehicles. Referring to FIG. 1, there is shown a prior art fluorescent lighting system 100. The lighting system 100 has been one choice used in commercial vehicle applications because long fluorescent bulbs 102 can be utilized. As shown herein, lighting system 100 includes one or more fluorescent light bulbs 102 disposed within a housing 104, having ballasts 106 disposed at either end of the fluorescent bulb 102. The ballasts 106 operate by passing electricity through the bulb 102 to excite mercury vapor contained therein. The excited mercury atoms produce short-wave ultraviolet light that then causes a phosphor coated on an interior surface of the bulb 102 to fluoresce, producing visible light.

In general, fluorescent lighting systems are better suited than incandescent bulbs for use in commercial vehicles. The fluorescent lights provide a generally uniform level of illumination throughout the entire length of the fluorescent bulb making them well suited for illuminating an entire length of the interior space of a commercial vehicle. In addition, fluorescent systems are more energy efficient than incandescent bulbs.

While fluorescent tubes may provide long, low-luminance sources of light over their entire emitting surface, there are also certain drawbacks to using fluorescent tubes in commercial vehicles. For a fluorescent bulb to operate, an electrical terminal or ballast must be disposed at both ends of the tube, thereby creating areas of less illumination within the passenger area between two fluorescent lighting systems that are placed end to end. An additional drawback is that fluorescent lamps are only available in discrete sizes. Not all areas needing illumination are of the same size and may not be particularly adapted to the discrete sizes for which the fluorescent lamps are manufactured. This design limitation further leads to dark areas in applications where the bulb needed for the lighting system is not available and a shorter bulb must be substituted. An additional drawback of fluorescent lights is that fluorescent bulbs that have reached "end of life" do not generate light in any section of the entire lamp length, which creates large dark areas in the application environment. An additional safety issue is the fact that fluorescent lamps contain mercury and phosphor, which requires special disposal practices to prevent environmental issues. Likewise, if the lamp is broken within a contained environment, such as a bus, there are passenger safety issues and contamination aspects that must be dealt with in addition to the presence of broken glass.

To overcome the deficiencies of fluorescent lights, lighting systems utilizing light emitting diodes (LEDs) have been proposed. LEDs do not contain dangerous gasses, they may provided in arrays of varying length, are dimmable, efficient, light weight, and have a long operational life that is not diminished by repetitive on/off power cycling. Because of these and other advantages, LED-based lighting systems are rapidly replacing traditional fluorescent lighting systems in a number of environments, including external vehicle lighting, military, commercial, and home environments.

LED-based lighting systems have, however, a number of drawbacks that must be addressed before they can be implemented for internal lighting in a commercial transportation environment. Referring now to FIG. 2, there is shown a prior art LED-based lighting system 200 comprising a plurality of individual LEDs 202 disposed in a single row. As can be seen from FIG. 2, one of the major drawbacks to utilizing an LED lighting system 200 for ambient lighting is that each LED 202 in the row of LEDs can be seen outside of the LED lighting system 200. This is sometimes referred to as creating 'bright spots,' 'hot spots,' 'pinholes,' 'tiger striping,' and/or 'zebra' lighting. The bright spots are distracting and would be unpleasing to both passengers and drivers if used in a transportation vehicle. A problem is thus created in that to minimize bright spots, the intensity of the light from the LEDs must be decreased, which would thereby decrease the level of illumination in the passenger area of a commercial vehicle. This could create a potentially dangerous situation.

One solution that has been proposed to counteract bright spots is an indirect lighting system such as the one shown in FIG. 3. In FIG. 3, an LED lighting system 300 having an LED strip 302 directed away from an area to be illuminated. The light from the LED strip 302 bounces off a reflective surface 304 before passing through a diffusive surface 306. The diffusive surface 306 has a plurality of curved surfaces on one or both sides thereof to further diffuse the light from the LED strip 302. In this way, the light from the individual LEDs is diffused by the reflective surface before illuminating the passenger area. However, light is lost when it is reflected off the back surface, making indirect lighting systems inefficient. Additionally, the need to align the LED strip for proper reflection and provide sufficient space between the LED strip and the reflective surface makes indirect lighting systems both complex and bulky. Therefore, an LED lighting system capable of providing diffuse light and is simple, efficient, and compact is needed.

SUMMARY

The present invention relates to LED lighting systems and methods with enhanced diffusive properties. Methods and systems for LED light-source cradles are thus provided which substantially eliminate or reduce disadvantages and problems associated with previous systems and methods. In some embodiments, the LED light-source cradle may include a plurality of openings for allowing portions of an LED to pass therethrough. In some embodiments, the cradle may have an engagement feature incorporated therein for mating with a light fixture. In some embodiments, a plurality of LEDs are attached to a printed wiring assembly (PWA). The cradle may have a plurality of locking features incorporated therein to hold the LED PWA in place. In some embodiments, the locking features may be mating grooves adapted to hold an LED PWA against the lighting feature. In some embodiments, a heat sink or other thermal conductor is adapted to be in thermal communication with the LED PWA for removing heat therefrom. The heat sink may be pressed against the light fixture to allow thermal conduction therebetween.

In various embodiments, a method of lighting with light emitting diodes (LEDs) oriented to directly radiate light energy onto a surface to be illuminated without bright spots being observable therefrom is provided including providing a light fixture having an illumination opening oppositely disposed from a mounting surface for passing light energy therethrough; removably engaging an LED assembly to the mounting surface within the light fixture, the LED assembly having a plurality of LEDs disposed thereon and oriented to radiate light energy directly through the illumination opening; coupling the LED assembly to a power source; providing a lens having select diffusivity and transmissivity properties such that light energy from the LEDs transmitted therethrough is sufficiently diffused to optically mask the LED light energy source such that bright spots are not observable therefrom; securing the lens across the illumination opening of the light fixture, the lens being disposed between the LED assembly and the surface to be illuminated; and wherein when power is provided to the LEDs, light radiates from the LEDs directly through the lens in a manner diffusing and optically masking the LED light energy.

In various embodiments, the method may also include wherein the lens has a transmissivity of greater than 50%; wherein light transmitted through the lens from a 100 lumen LED disposed two inches from the lens will uniformly illuminate the lens; wherein the lens has a thickness of on the order of 0.12 inches; wherein the lens comprises a structural element of the light fixture; securing the lens across the illumination opening of the light fixture provides structural support thereto; wherein the LED assembly has a power supply integrally formed therein and adapted to be coupled to the power source; using the power supply to provide pulse-width modulation for controlling the light intensity of the LEDs; wherein if one LED of the plurality of LEDs fails, current to the other LEDs is increased to compensate for the failure; wherein the LED assembly comprises a cradle and an LED printed wiring assembly; wherein removably engaging the LED assembly to the mounting surface includes passing a plurality of spring-push rivets through the LED assembly and into the mounting surface; providing the mounting surface with a plurality of engagement pegs protruding therefrom; providing the LED assembly with a cradle having a plurality of keyholes disposed therein; wherein removably engaging the LED assembly to the mounting surface includes passing the engagement pegs through the cradle for interconnection therewith; the LED assembly having a plurality of engagement features protruding from edges thereof; and wherein removably engaging the LED assembly to the mounting surface includes latching the engagement features against opposite sides of the mounting surface; wherein the light fixture includes translucent end caps disposed on opposite sides thereof; wherein optically masking the LED light energy comprises rendering outlines of the LEDs indistinguishable one from another through the lens; wherein when power is provided to the LEDs, locations of the LEDs are not observable.

In various embodiments, a system for providing lighting using light emitting diodes (LEDs) oriented to directly radiate light energy onto a surface to be illuminated without bright spots being observable therefrom is provided where the system may include a light fixture having an illumination opening oppositely disposed from a generally flat mounting surface; a cradle mateably engaging the mounting surface of the light fixture; an LED assembly having a plurality of LEDs disposed thereon, the LED assembly being disposed between the mounting surface and the cradle; a translucent lens disposed across the opening, the lens having select diffusivity and transmissivity properties such that light energy from the LEDs transmitted therethrough is sufficiently diffused to optically mask the LED light energy source such that bright spots are not observable therefrom; and wherein when power is provided to the LEDs, light radiates from the LEDs directly through the lens in a manner diffusing and optically masking the LED light energy.

Various embodiments of the present invention may possess one, some, or none of the above-listed benefits. The aspects described herein are illustrative. It is noted that there are many and various embodiments that can be employed without departing from the spirit and principles of the present invention, and the description of the listed embodiments is not to be construed as the only embodiments that incorporate the spirit and principles of the present invention.

BRIEF DESCRIPTION OF THE DRAWINGS

A more complete understanding of the methods and systems of the present invention may be obtained by reference to the following Detailed Description when taken in conjunction with the accompanying Drawings, wherein.

DETAILED DESCRIPTION

Various embodiments of the present invention will now be described more fully with reference to the accompanying drawings. The invention may, however, be embodied in many different forms and should not be constructed as limited to the embodiments set forth herein; rather, the embodiments are provided so that this disclosure will be thorough and complete, and will fully convey the scope of the invention to those skilled in the art.

Increasingly, LEDs are replacing other types of lighting systems because they may offer a highly efficient, small sized, highly durable, long lasting, fully dimmable, mercury-free option compared to incandescent and/or fluorescent lighting systems. However, despite these numerous potential benefits, implementation of LED lights into transportation vehicles has been suppressed due to several difficulties. For example, LED light fixtures typically have a plurality of densely spread fasteners coupling the LED light fixture to the LED printed wiring assemblies (PWA) in order to provide sufficient pressure across the entire PWA to dissipate heat generated by the LEDs. The plurality of fasteners often makes installation and replacement of the LED PWAs difficult and time consuming. Because installation and replacement of LED PWAs in commercial vehicles needs to be quick and easy, the commercial transportation industry has be reticent to implement LED-based lighting systems for internal lighting.

Figure 1:
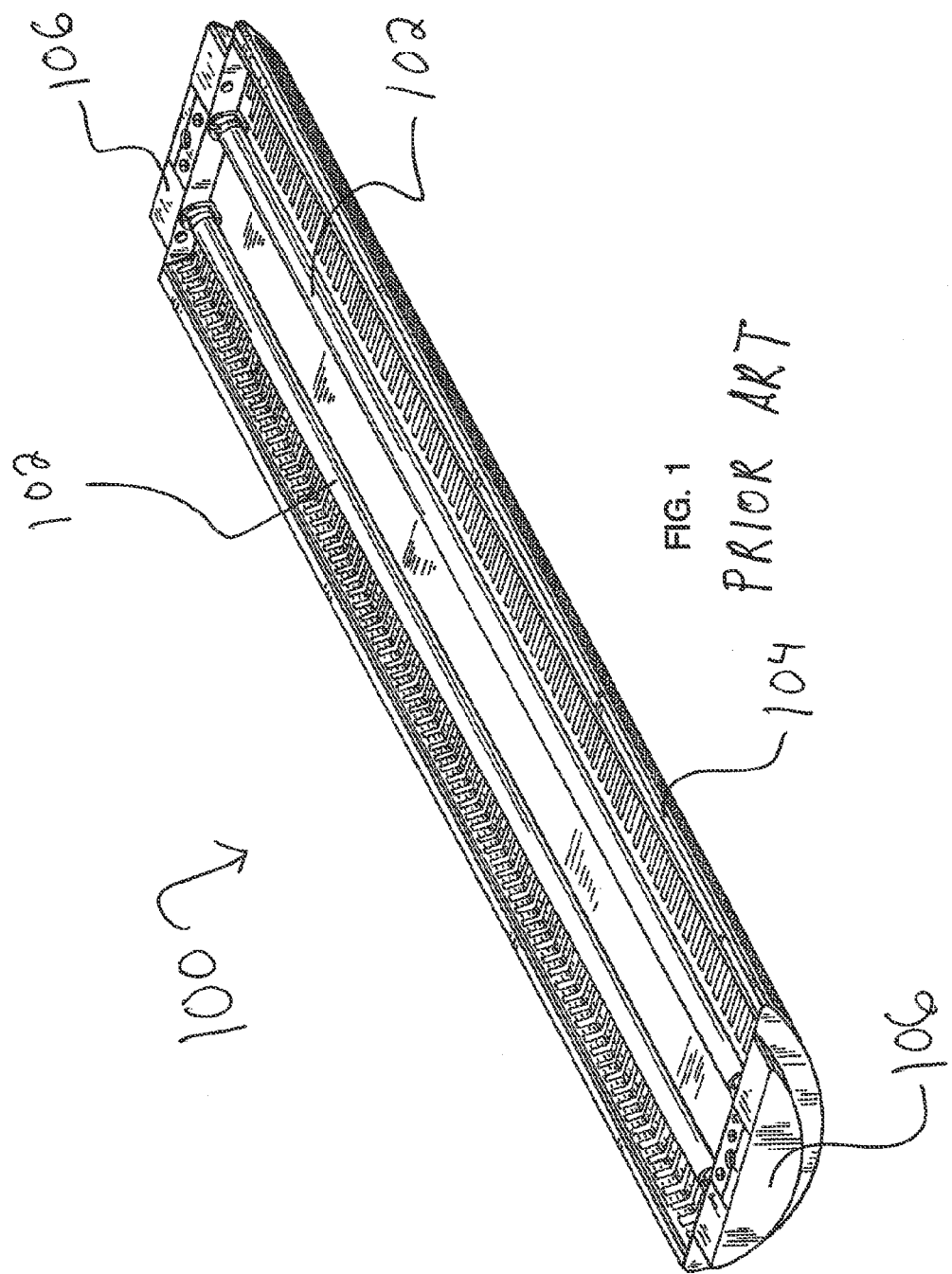
FIG. 1 is a perspective view of a prior art fluorescent light fixture having two fluorescent bulbs disposed therein.
Figure 2:
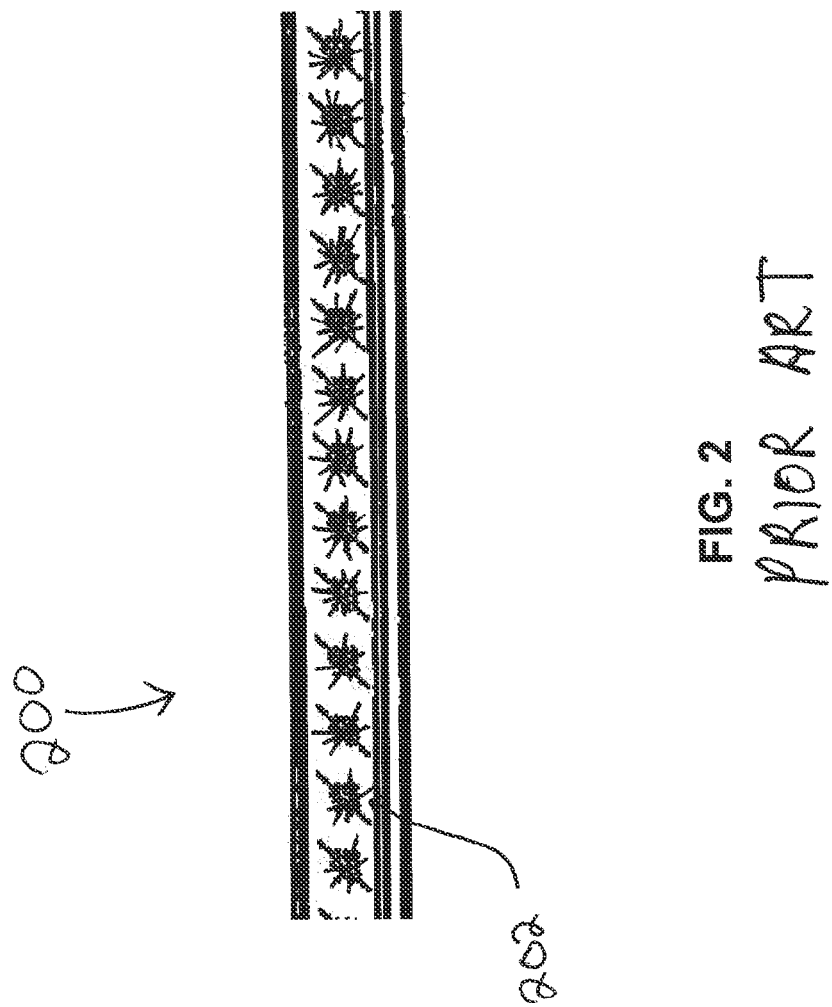
FIG. 2 is a perspective view of a prior art LED strip having a plurality of LEDs therein.
Figure 3:
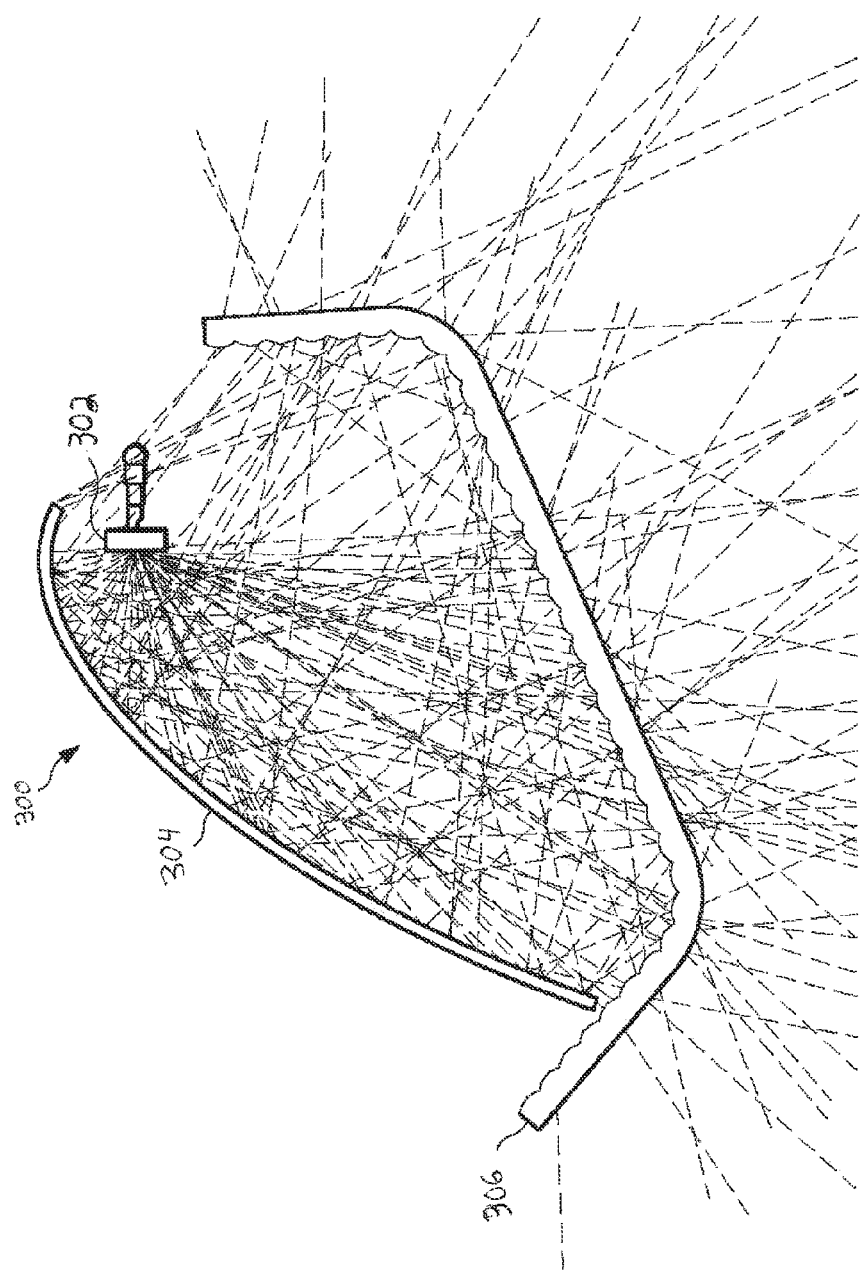
FIG. 3 is a side view of a prior art indirect lighting system having a reflective surface and a transmissive surface.

An additional obstacle to utilization of LED lights for illumination of passenger areas in commercial vehicles is that the light provided by such LED-based lighting systems must be passenger friendly. Oftentimes, to illuminate the interior space of a commercial vehicle having a long chassis, LED-based lighting systems include strips of LEDs having a plurality of discrete LEDs spaced apart along a length of a mounting assembly. However, in contrast to fluorescent bulbs, which provide low-luminance along the entire length of the fluorescent tube, LEDs tend to emit a narrow beam of intensely bright light causing bright spots as shown in FIG. 2. Bright spots can be very distracting to passengers and drivers of commercial vehicles. In the past, attempts have been made to overcome bright spots by providing indirect lighting to a passenger area. However, by reflecting the light off a surface prior to illuminating the area, high transmission losses make indirect lighting methods less efficient. For example, in some cases, over 30% of the light may be lost each time it is reflected off a surface. Additionally, light diffused enough to mask bright spots requires the LEDs to be spaced apart from the reflective surface making indirect lighting systems bulky.

Figure 4:
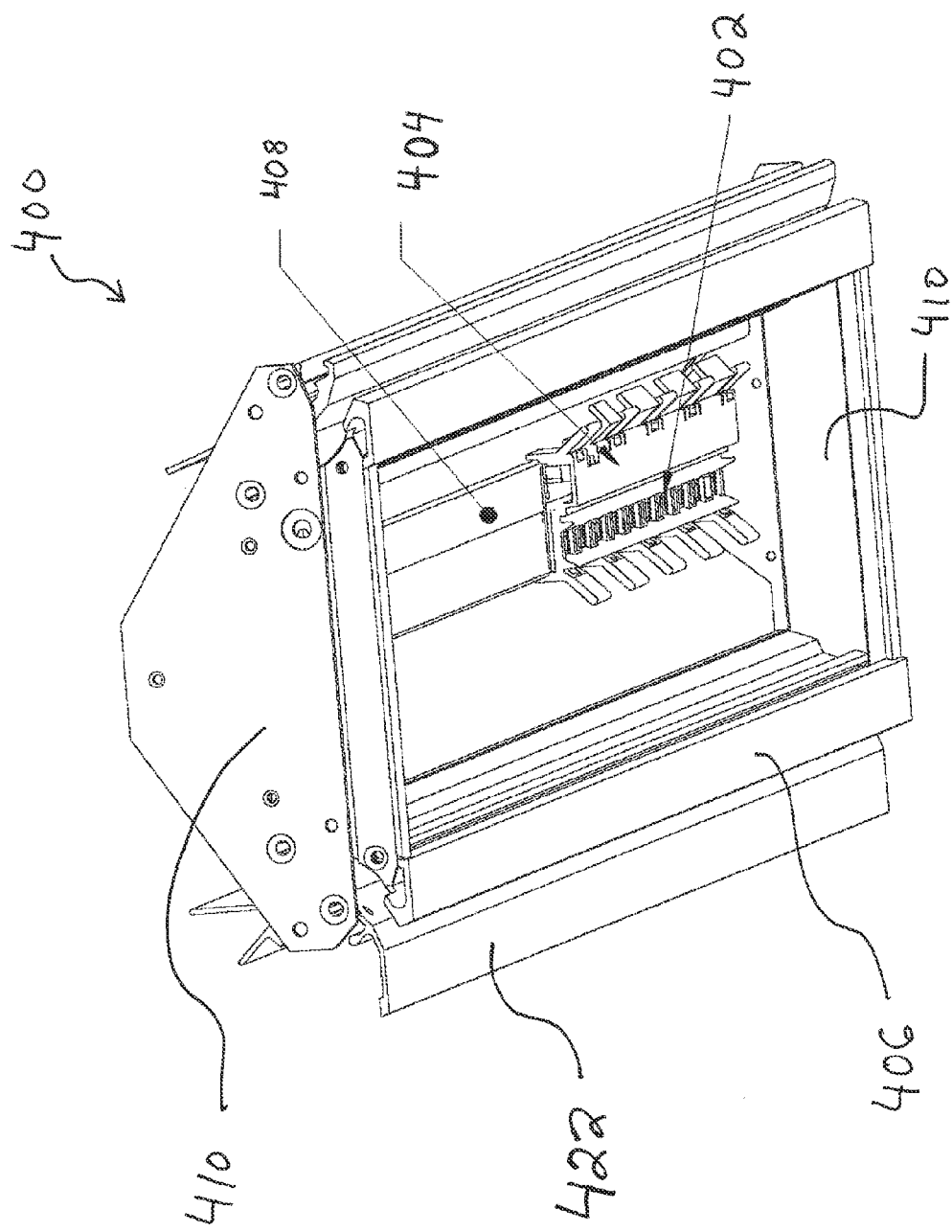
FIG. 4 is an underneath perspective view of an embodiment of a light fixture having a cradle with an LED PWA disposed therein in accordance with the principles of the present invention.

Referring now to FIG. 4, there is shown an underneath perspective view of a direct LED lighting system 400 constructed in accordance with the principles of the present invention. The direct LED lighting system 400 is shown herein having a light fixture 406 that provides diffused lighting to a passenger area of a transportation vehicle such as, for example, a bus, rail car, airplane, or other vehicle. In some embodiments, the light fixture 406 may be adapted to be attached to the chassis of the transportation vehicle such as along the corners or down the middle of a roof thereof. In various embodiments, the light fixture 406 has a cradle 404 disposed therein adapted to secure a plurality of LEDs 402 located on a PWA (not shown) within the light fixture 406. In some embodiments, the cradle 404 may be adapted to be snapped into place or otherwise removably secured for ease of installation/replacement. The cradle 404 is adapted to be oriented so that light emanating from the plurality of LEDs 402 may be passed through a lens (not shown) or other transmissive material disposed between the LEDs 402 and the passenger area. As described in more detail below, in some embodiments, the lens may have diffusive properties capable of masking bright spots created by the LEDs 402 such that the light passing therethrough is distorted, for example, in such a way that the individual LEDs 402 may not be distinguishable, one from another, by an observer looking through the lens.

In the embodiment shown, the light fixture 406 has end caps 410 disposed on either end thereof. In various embodiments, one or both of the end caps 410, or portions thereof, may be translucent to allow light to pass therethrough, thereby eliminating dark spots that would otherwise be created by ballasts or other light-impermeable materials. Additionally, the end caps 410 may provide for a dust seal to minimize the amount of dust infiltrating the light fixture 406.

In some embodiments, the cradle 404 and/or internal surfaces of the light fixture 406 may comprise reflective material for diffusing and reflecting light from the LEDs 402. In some embodiments, a highly-reflective paint or other material may be applied to the cradle 404 and/or internal surfaces of the light fixture 406 to increase reflectivity thereof.

As described in more detail below, in some embodiments, a portion of the light fixture 406 may be adapted to provide a heat sink 408 for the LEDs 402. In some embodiments, a thermal pad (not shown) may be disposed between the LED PWA and the heat sink 408, wherein the cradle 404 may be adapted to apply pressure to the LED PWA against the heat sink 408 for increased thermal conduction. In the embodiment shown, the cradle 404 has extrusions along edges thereof adapted to engage the light fixture 406 for securing the cradle 404 thereto and ensuring pressure therebetween. As will be described in more detail below, in various embodiments, the cradle 404 may be secured against the light fixture 406 using a plurality of spring-push rivets (not shown), a keyhole locking assembly (not shown), or various other methods of securement. For descriptive purposes, the cradle 404 only extends partially down the length of the light fixture 406. However, in various embodiments, the cradle 404 may extend down substantially all of the length of the light fixture 406. Similarly, in various embodiments, the light fixture 406 and the cradle 404 may be of any length depending on the application. In the embodiment shown, the cradle 404 is shown securing an LED PWA having nine LEDs 402. However, in various embodiments, the LEDs 402 may be spaced closer together or further apart depending on the application. Similarly, any number of rows and/or density of LEDs 402 may be utilized in conjunction with the cradle 404 and light fixture 406.

In various embodiments, the light fixture 406 may include one or more external surfaces 422 adapted to displaying information thereon. In various embodiments, a very-high bond tape, for example, VHB TAPE by 3M, may be applied to the one or more external surfaces 422 of the light fixture 406 for facilitating adherence of advertisement placards or other information displays thereagainst. Additionally, the very-high bond tape may also be applied to various junctions and/or seems to act as a damping agent and reduce rattling or other audible noises.

Figure 5:
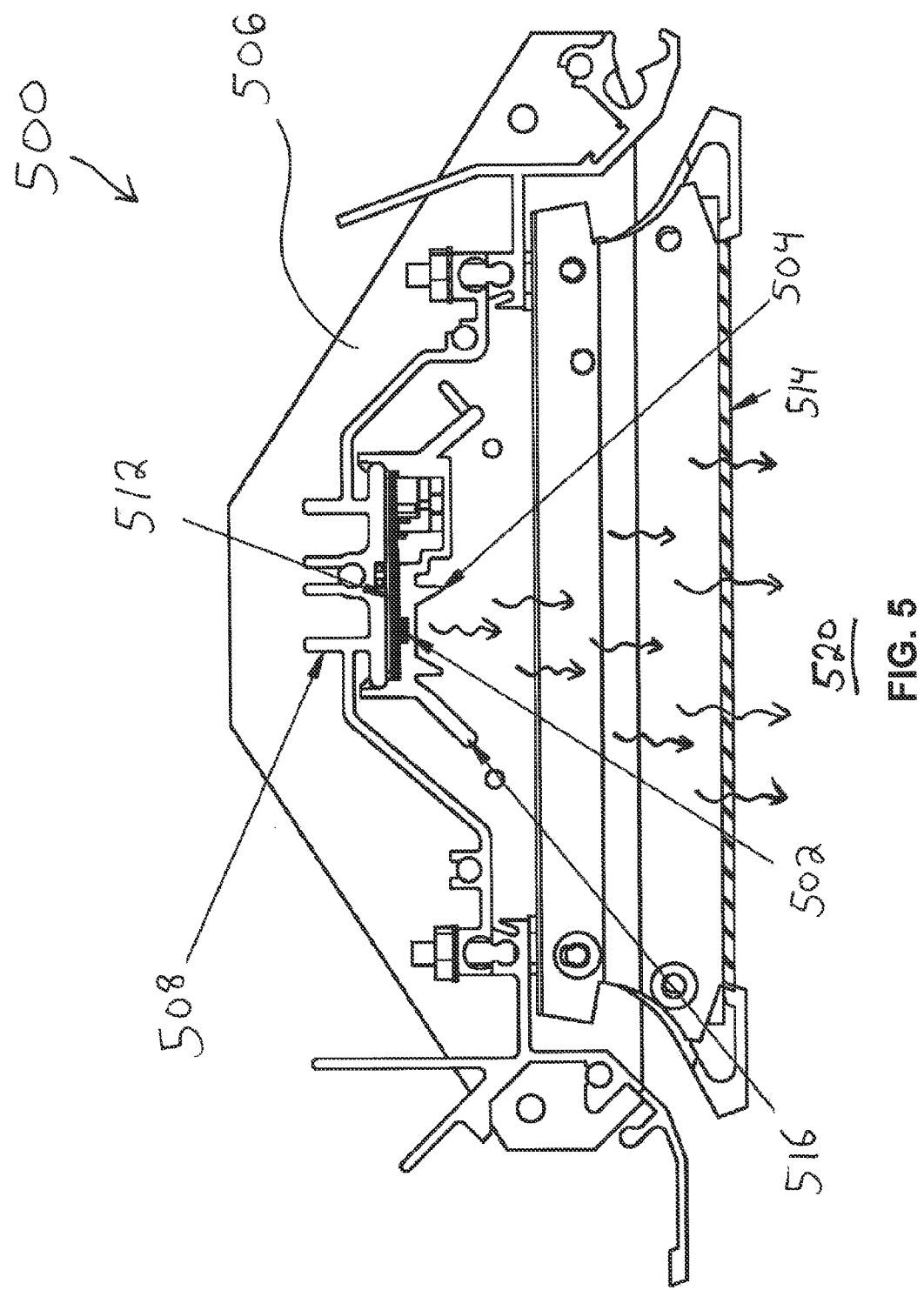
FIG. 5 is a side view of the light fixture of FIG. 4 having the cradle and the LED PWA disposed therein.

Referring now to FIG. 5, there is shown a side view of an assembled LED-based lighting system of FIG. 4. LED-based lighting system 500 is shown having a light fixture 506 with a cradle 504 secured thereagainst. From this view, it can be seen that the cradle 504 is adapted so that an LED PWA 512 may be disposed between the cradle 504 and the light fixture 506 to allow heat to dissipate from a backside of the LED PWA 512 to a heat sink extrusion 508. It can also be seen that the LED PWA 512 fits against a backside of the cradle 504 so that light emitted from the LEDs 502 of the LED PWA 512 can pass therethrough. In some embodiments, a thermal pad (not shown) or a thermal gel may be disposed between the LED PWA 512 and the heat sink 508. The thermal pad and/or thermal gel may be formed of a thermally conductive material adapted to transfer heat from the LED PWA 512 to the heat sink 508 of the light fixture 506. The heat sink 508 may include fins formed thereon to further facilitate heat dissipation from the LEDs 502. In some embodiments, the cradle 504 may be formed with engagement features 516 extending from one or both sides thereof to snugly fit around edges of the heat sink 508 for securing the cradle 504 to the light fixture 506. In some embodiments, the cradle 504 may be formed of plastic, metal, or other material, wherein the material may be highly reflective or a highly reflective material may be applied to surfaces thereof. Similarly, interior surfaces of the light fixture 506 may comprise a reflective material to increase the amount of light reflected off surfaces thereof. In addition, the cradle 504 and/or the light fixture 506 may comprise one or more extrusions adapted to reflect light away from various nooks disposed within the light fixture 506.

In some embodiments, the engagement features 516 of the cradle 504 may also include extrusions protruding outwardly therefrom adapted to facilitate installation and removal of the cradle 504 relative to the light fixture 506. For example, the extrusions of the engagement features 516 may be disposed along opposite sides of the cradle 504 and adapted so that pressure applied to one or more of the handles causes the engagement features 516 to disengage from the heat sink 508 to more easily allow removal of the cradle 504. As explained in more detail below, in some embodiments, additional measures for facilitating securement and removal of the cradle 504 relative to the light fixture 506 may be utilized such as, for example, screws, rivets, adhesives, latches, or other methods of removable attachment.

In the embodiment shown, the light fixture 506 has extrusions extending from a lower portion thereof adapted for securement of the lens 514. In some embodiments, the extrusions of the light fixture 506 may include grooves on either side thereof to allow the lens 514 to be snapped or slid into place for ease of assembly. In other embodiments, the extrusions may be rotatable, bendable, movable, lockable, or otherwise adapted to secure the lens 514 in place. In various embodiments, the lens 514 may be formed from extruded plastic, plastic sheets, or other material, may be smooth or patterned on one or both sides thereof and may be white, blue, or other color. In various embodiments, the lens 514 may be adapted to provide structural support for the lighting fixture 506. When structural support is provided, the lighting fixture 506 may be thinner, lighter, and/or require less material making assembly and use thereof cheaper. In addition to providing structure support, the lens 514 may also be adapted to provide a level of tamper resistance to the lighting assembly 500, which is often a concern in commercial vehicle application. In some embodiments, a plurality of different colored lenses may be utilized in a single commercial vehicle. For example, one or more light fixtures close to a driver may have a blue color or other dark color to minimize distractions to the driver while one or more light fixtures further away from the driver may have a white color or other bright color.

As can be seen in the embodiment shown, the LEDs 502 are oriented such that a majority of the light emanating from the LEDs 502 is transmitted directly from the LEDs 502 to the passenger area 520, rather than reflecting a majority of the light off a reflective surface before transmitting the light to the passenger area (i.e., indirect lighting). Because there are losses due to reflecting the light off a surface prior to illumination of an area, indirect lighting systems are often less efficient than direct lighting systems. However, because the majority of the light in a direct lighting system is not reflected off any surfaces prior to illuminating the passenger area 520, the lens 514 disposed between the LEDs 502 and the passenger area 520 must sufficiently diffuse the light in order to mask bright spots. The lens 514 must therefore be formed such that it provides sufficient diffusive properties while at the same time providing sufficient transmission of the light therethrough. Therefore, when designing the lens 514, various factors must be considered including, transmissivity of the material, diffusivity of the material, thickness of the material, color of the material, rigidity of the material, and/or other criteria.

Additional consideration must also be given to the intensity of the LEDs 502 and the envelope of the light fixture 506, that is the distance between the lens 514 and the LEDs 502. To mask bright spots, the lens 514 must completely diffuse the light from the LEDs 502 at a given distance and intensity. For example, in some embodiments, the entire height of the direct lighting system may be on the order of, for example, four inches, which, in some cases, may be up to three or more inches smaller than other systems. In other embodiments, the direct lighting system may be more or less than four inches.

In various embodiments, plastic is used to form the lens 514. In some embodiments, the lens 514 may be formed from plastic sheets, from extruded plastic, or other manufacturing method. In various embodiments, an extruded plastic having a transmissivity on the order of, for example, 58% at a thickness on the order of 0.12 inches may be utilized. In various other embodiments, an sheet plastic having a transmissivity on the order of, for example, 56% at a thickness on the order of 0.12 inches may be utilized. In various embodiments, the plastic may be a resin polycarbonate, such as, for example, LEXAN FXD121R, Sabic grade FXD153 color WH4D459X, Sabic grade SG308OB color WH6D06, each from SABIC Innovative Plastics, or other plastic, glass, or other material. In various embodiments, the lens 514 may be able to completely diffuse light from an 100 lumen LED positioned 2 inches behind the lens 514. In various embodiments, the lens 514 may be of any color. Because various colors each have varying transmissivity and diffusivity, when designing the lens 514, the diffusive and transmissive properties must be matched for the color that will be used in such a way as to provide sufficient lighting to the passenger area while at the same time masking bright spots.

Figure 6:
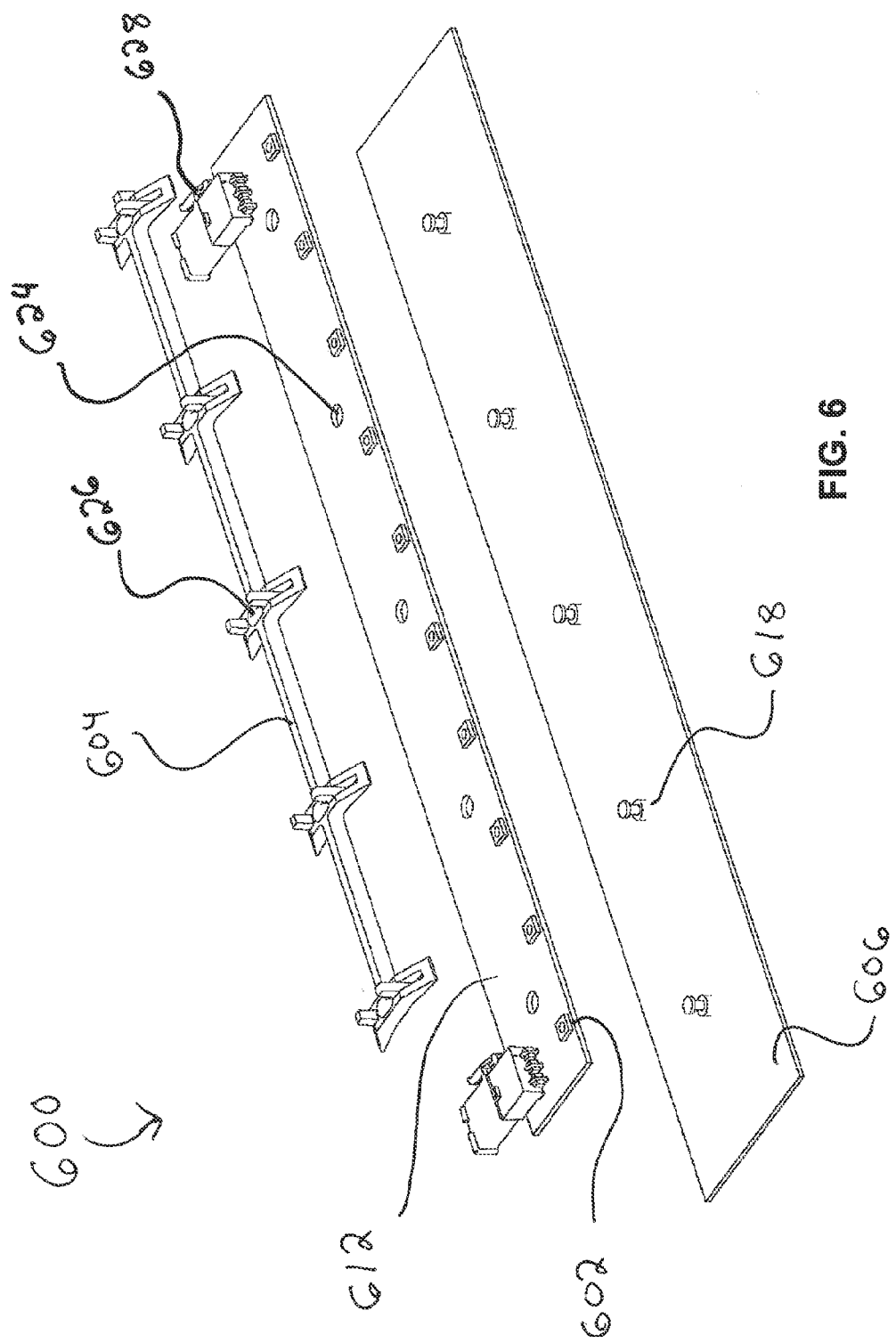
FIG. 6 is an exploded perspective view of an alternative embodiment of an LED PWA and cradle assembly.

Referring now to FIG. 6, there is shown an exploded perspective view of an alternative embodiment of an LED-based direct lighting system having different engagement features for removably securing a cradle to a light fixture. In the embodiment shown, keyhole-cradle lighting assembly 600 includes a keyhole cradle 604, an LED PWA 612 having a plurality of LEDs 602 thereon, and a portion of the light fixture 606 having a plurality of engagement pegs 618 disposed thereon. In various embodiments, the light fixture 606 may have a plurality of engagement pegs 618 protruding from a surface thereof, such as, for example, from the portion of light fixture 606 comprising the heat sink (shown in FIGS. 4 and 5). The engagement pegs 618 may be integrally formed from the light fixture 606, may be welded, adhered, snapped in, or otherwise secured against the light fixture 606. In various embodiments, the engagement pegs 618 may first be secured to a plate or other surface and the plate or other surface may then be secured to the light fixture 606. As can be seen, the LED PWA 612 includes a plurality of holes 624 therein adapted to align with the engagement pegs 618 of the light fixture 606. Similarly, the keyhole cradle 604 includes a plurality of keyholes 626 therein adapted to align with the engagement pegs 618 of the light fixture. As explained in more detail below, the LED PWA 612 may be oriented such that the engagement pegs 618 pass through corresponding holes 624. Thereafter, the keyhole cradle 604 may be oriented such that the engagement pegs 618 pass through corresponding keyholes 626 for mating engagement therewith.

In various embodiments, a power supply 628 may be integral to the LED PWA 612. The power supply 628 may include connectors on opposite ends of the LED PWA 612 adapted to allow an input of current from one end and an output of current from the other end. In this way, a plurality of LED PWAs 612 may be coupled together end to end. Oftentimes, a plurality of lengths of LED PWAs 612 may be required depending on the application. Custom manufacturing a light fixture to fit a particular length may be cost prohibitive in many instances. In various embodiments, manufacturing costs may be reduced because a plurality of different lengths of LED PWAs 612 may be manufactured where each different LED PWA 612 utilizes the same type of power supply 628, thereby eliminating the need to custom manufacture a plurality of different power supplies. For example, a six-inch LED PWA, a twelve-inch LED PWA, and a twenty-four inch LED PWA may all use the same type of power supply. In various embodiments, the power supply 628 may be capable of controlling the intensity of the light from the LEDs 602. For example, the power supply 628 may utilize pulse-width modulation (PWM) to increase or decrease the output of the LEDs 602. In some embodiments, a light fixture may have a very thin envelope, thereby requiring the output of the LEDs 602 to be dimmed in order to mask bright spots. If the dimmed light does not provide sufficient illumination to the passenger area, more LEDs 502 may be added to a given length of the LED PWA 612 or a different lens material may need to be utilized.

In various embodiments, the power supply 628 may be utilized to compensate for the difference between older and newer LEDs 502. For example, if a plurality of LED PWAs 612 have been in use in a commercial vehicle for a period of time and one or more, but less than all, of the LED PWAs 612 need to be replaced, the older LED PWAs 612 may produce less light than the newer LED PWAs 612. This difference in illumination may be undesirable to passengers of the commercial vehicle. In such cases, the illumination of the newer LED PWAs 612 may be dimmed to match the illumination of the older LED PWAs 612 thereby producing a more uniform illumination of the passenger area of the vehicle. In some embodiments, an installer may manually dim the newer LED PWAs 612 to a desired level. In some embodiments, the LED PWAs 612 may automatically dim based on various factors. In some embodiments, the power supply 628 may also be utilized to provide LED redundancy or system redundancy. For example, providing LED redundancy may include providing additional current to the LEDs of an LED PWA when one or more LEDs on the LED PWA fail in order to compensate for the failure. In addition, providing system redundancy may include providing additional current to LED PWAs when one or more LED PWAs fail in order to compensate for the failure.

Figure 7:
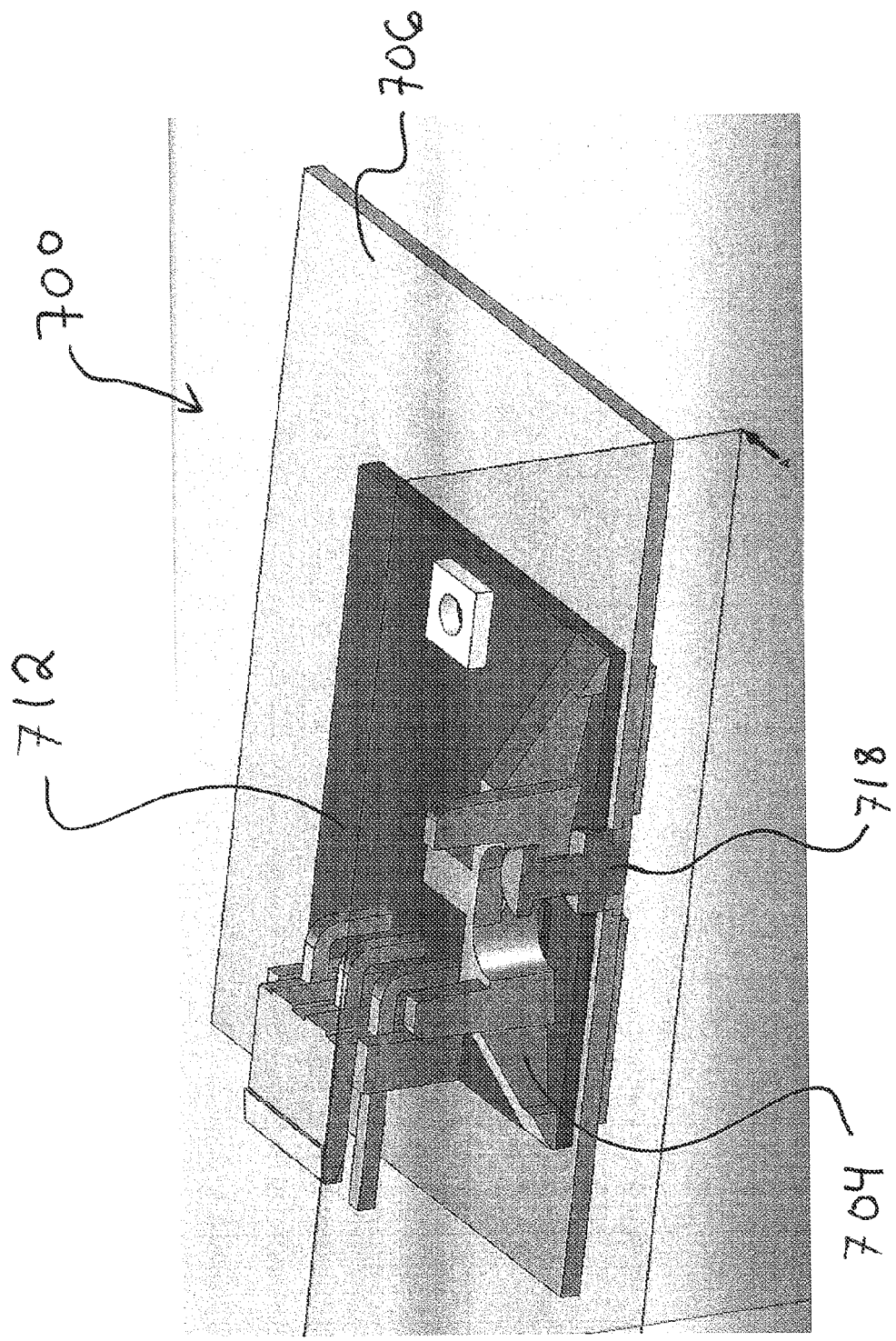
FIG. 7 is a perspective view of a cross section of an assembled embodiment of the keyhole cradle lighting assembly of FIG. 6.

Referring now to FIG. 7, there is shown a cross-sectional view of an assembled embodiment of the keyhole-cradle lighting assembly of FIG. 6 along line A-A. As can be seen, the engagement peg 718 extends outwardly from the surface of the light fixture 706, through the LED PWA 712, and mateably engages the keyhole cradle 704. In this way, the keyhole cradle 704 may be oriented such that upon engagement with the engagement peg 718 of the light fixture 706, the LED PWA 712 disposed therebetween is secured in place and sufficient pressure is provided to the LED PWA 712 to provide thermal conduction between the LED PWA 712 and the light fixture 706 to conduct heat generated by the LEDs to the light fixture 706.

Figure 8:
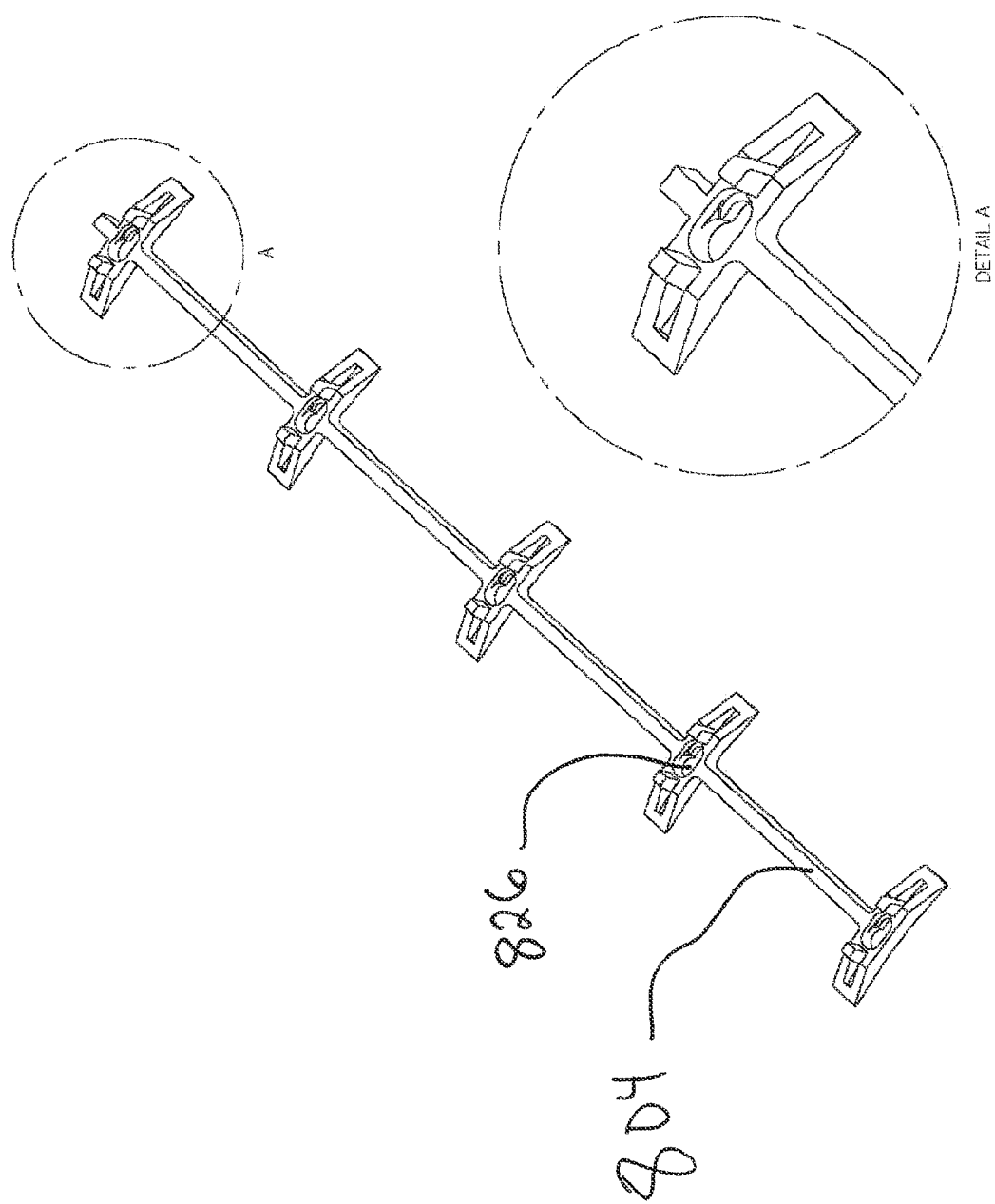
FIG. 8 is an perspective view of an embodiment of a keyhole cradle of the keyhole cradle lighting assembly of FIG. 6.

Referring now to FIG. 8, there is shown a perspective view of the keyhole cradle of FIG. 6. In various embodiments, keyhole cradle 804 includes keyholes 826. The keyholes 826 of the keyhole cradle 804 may have a generally oblong shape with a first portion of the keyhole 826 and a second portion of the keyhole 826 having a width smaller than the width of the first portion. In operation, the engagement pegs may be passed through the larger width of the first portion and then the keyhole cradle 804 may be slid sideways to move the engagement pegs from the first portion to the second portion. The engagement pegs may have a lip adapted to matingly engage a lip of the second portion and thereby prohibit the engagement pegs from passing back through the keyhole 826. When removal of the keyhole cradle 804 and/or the LED PWA (not shown) is required, the keyhole cradle 804 may be slid sideways to move the engagement pegs from the second portion of the keyholes 826 to the first portion, thereby allowing the engagement pegs to pass through the keyholes 826. In various embodiments, the mating engagement may comprise various other types of mating engagement adapted to facilitate installation and removal of the LED PWAs.

Figure 9:
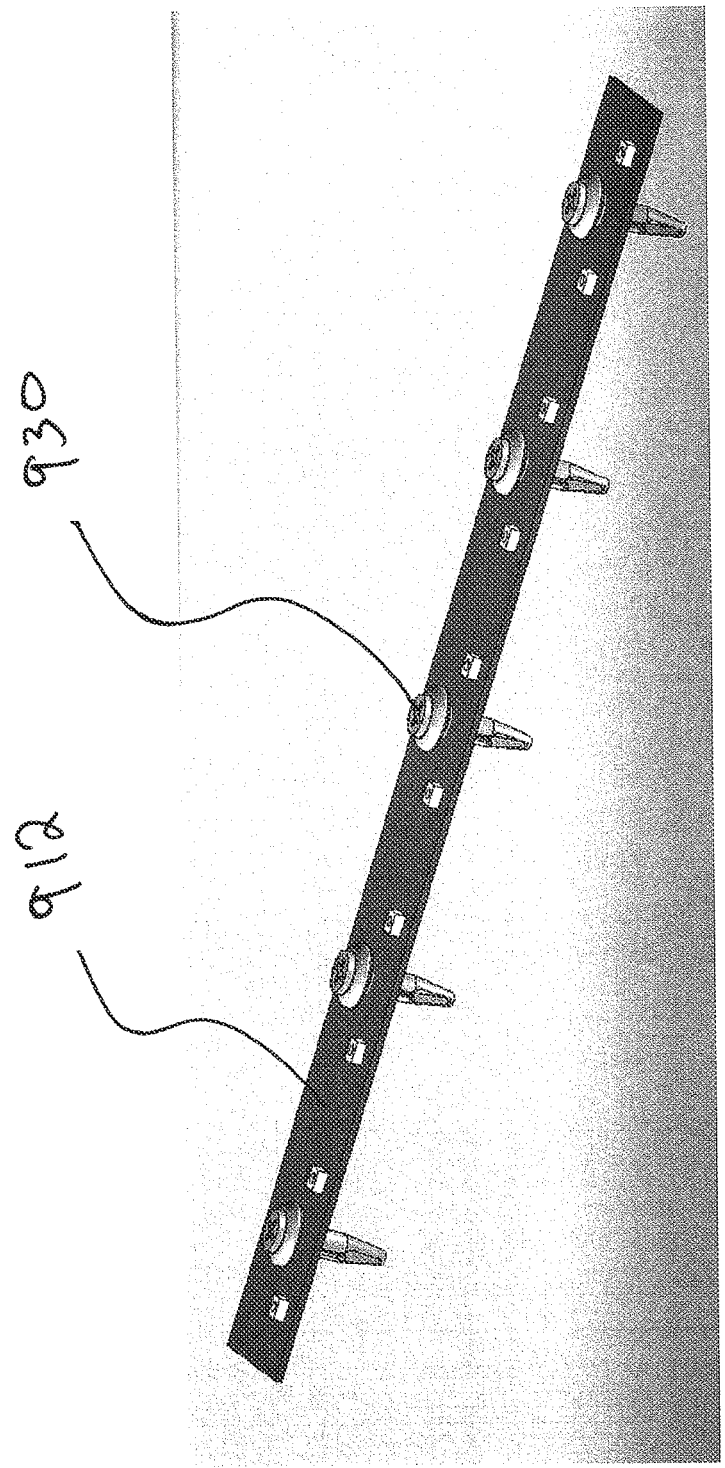
FIG. 9 is an LED PWA having a plurality of spring-push rivets therein.

Referring now to FIG. 9, an LED PWA 912 is shown having a plurality of spring-push rivets 930 disposed therein. In this embodiment, the LED PWA 912 may be secured against a light fixture (not shown) without the need for a cradle. For example, the light fixture may have a plurality of holes disposed therein and the LED PWA 912 may have a plurality of holes corresponding to the holes in the light fixture. After the holes of the LED PWA 912 have been aligned with the holes of the light fixture, the plurality of spring-push rivets may be inserted through the LED PWA 912 and the light fixture for securing the LED PWA 912 thereto.

Figure 10:
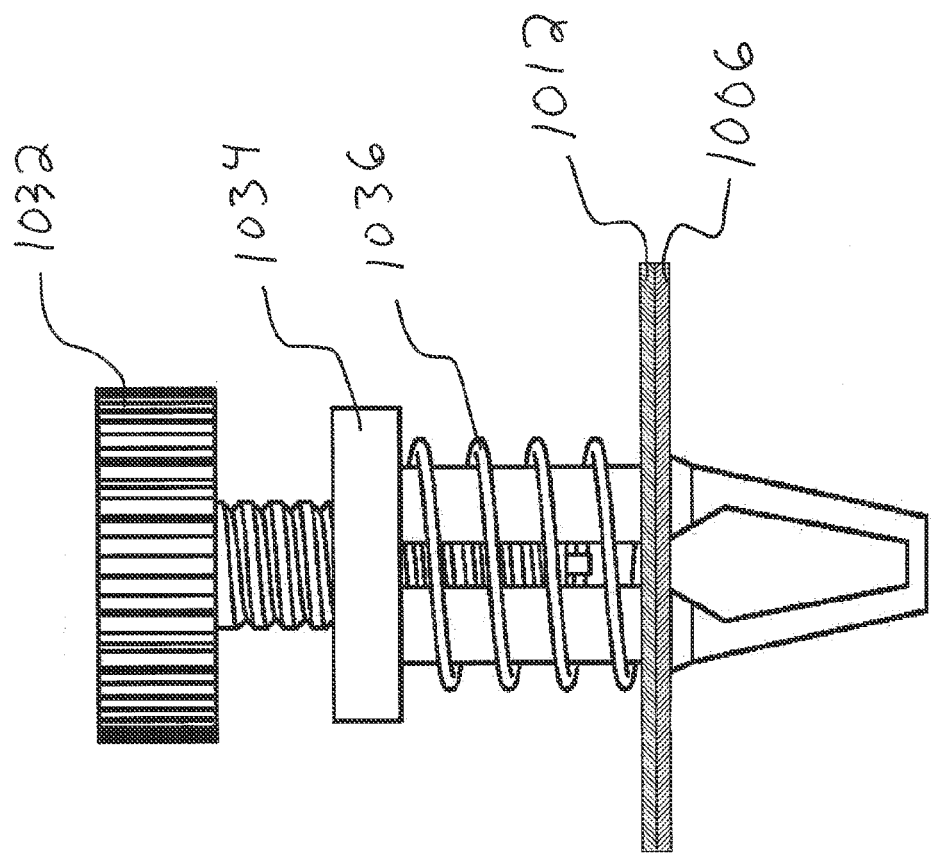
FIG. 10 is a side view of a spring-push rivet.

Referring now to FIG. 10, there is shown a side view of an embodiment of a spring-push rivet of FIG. 9. Spring-push rivet 1030 may be utilized to hold the LED PWA 1012 against the light fixture 1006 with a constant and controlled amount of force. In various embodiments, the spring-push rivet 1030 includes a spring 1036, a rivet 1034, and a screw 1032. In various other embodiments, a washer (not shown) may also be included adapted to be disposed between the LED PWA 1012 and the spring 1036. In the embodiment shown, the spring-push rivet 1030 has been inserted through the holes of the LED PWA 1012 and the light fixture 1006. Protrusions from the rivet 1034 can be seen engaging the light fixture 1006 for temporarily holding the rivet 1034 therein. The screw 1032 may then be inserted further into the rivet 1034, thereby causing the inserted portion of the rivet 1034 to expand outwardly and secure the LED PWA 1012 against the light fixture 1006. In this way, the screw 1032 may be unscrewed from the rivet 1034 when the LED PWA 1012 needs to be removed or replaced. In various embodiments, the rivet 1034, spring 1036, and screw 1032 may be plastic, metal, or other material and may each be formed of the same material or may be formed of different materials. In some embodiments, the spring 1036 may not be a spiral spring, but may be other features adapted to provide pressure against the LED PWA 1012, such as, for example, extrusions extending from the rivet 1034.

Figure 11:
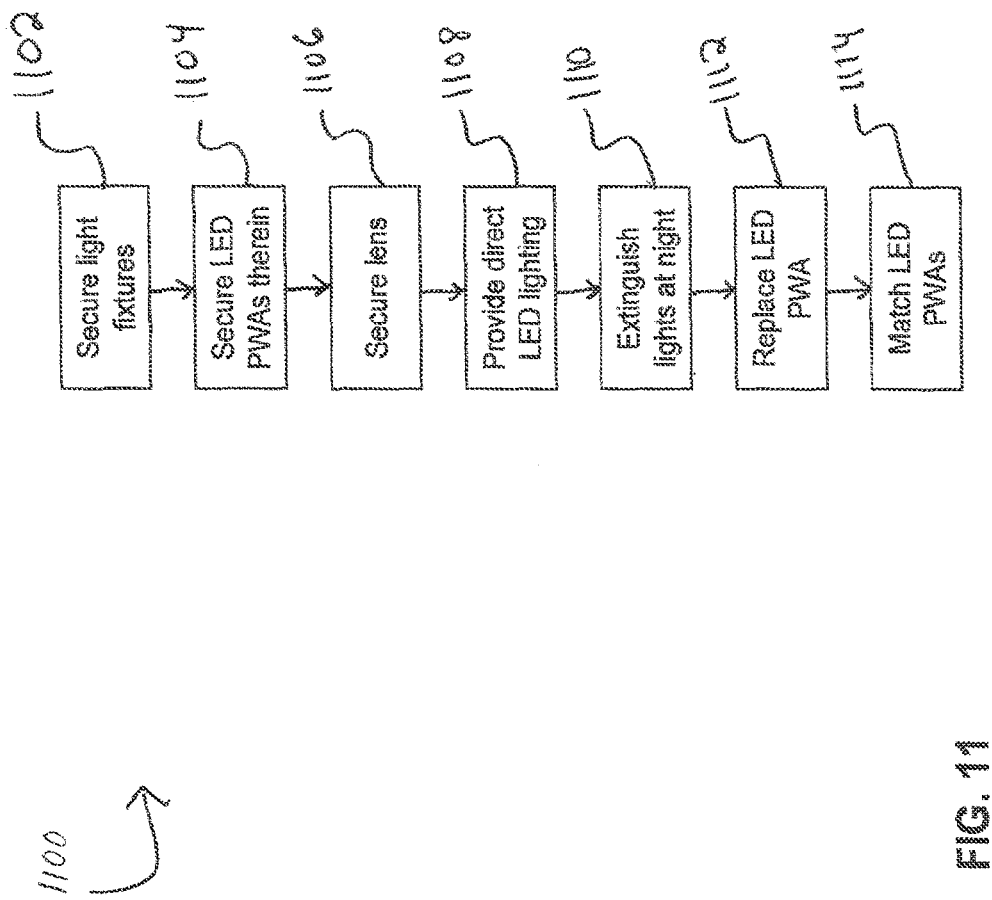
FIG. 11 is a flow diagram illustrating a process for providing direct LED lighting to a commercial vehicle.

FIG. 11 is a flow diagram illustrating a process 1100 for providing direct lighting to a passenger area of a commercial vehicle. At step 1102, a plurality of light fixtures are secured to a chassis of a commercial vehicle. At step 1104, a plurality of LED PWAs are secured to the light fixtures. At step 1106, a lens is secured to the light fixtures. At step 1108, the LEDs are illuminated to provide light to the passenger area of the commercial vehicle while at the same time bright spots are masked. At step 1110, one or more banks of light fixtures proximate to a driver of the commercial vehicle may be extinguished at night. At step 1112, an LED PWA is replaced with a new LED PWA. At step 1114, the intensity of the light from the new LED PWA is dimmed to match the older LED PWAs.

Figure 12:
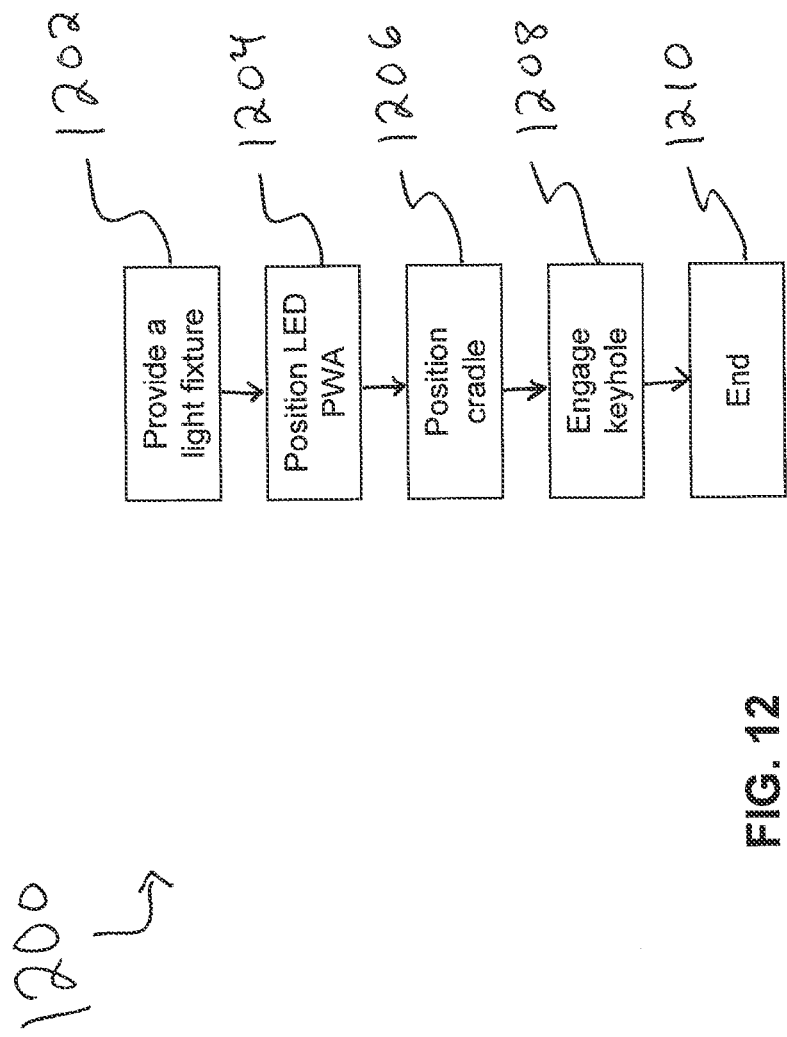
FIG. 12 is a flow diagram illustrating a process for slidably engaging a keyhole cradle against a light fixture.

FIG. 12 is a flow diagram illustrating a process 1200 of engaging a cradle with a light fixture for securing an LED PWA therebetween. At step 1202, a light fixture is provided having a plurality of engagement pegs disposed thereon. At step 1204, an LED PWA is positioned against the light fixture such that the plurality of engagement pegs pass therethrough. At step 1206, a cradle is positioned against the LED PWA so that the plurality of engagement pegs pass through corresponding keyholes on the cradle. At step 1208, pressure is applied to the cradle towards the light fixture, thereafter, the cradle is slide sideways until the plurality of engagement pegs are disposed in the narrow locking portion of the keyholes. At step 1210, the process ends.

It should be noted that the attached drawings thus provide an illustration of an illumination system incorporating multiple LEDs to illuminate an area utilizing light from the LEDs passing through a transmissive element. The illumination system as herein set forth may be seen to be able to incorporate multiple features for mounting hardware and installation components therewith. This system further may incorporate features for thermal conductivity and dissipation.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method of lighting with light emitting diodes (LEDs) oriented to directly radiate light energy onto a surface to be illuminated without bright spots being observable therefrom, the method comprising:
   providing a light fixture having an illumination opening oppositely disposed from a mounting surface for passing light energy therethrough;
   removably engaging an LED assembly to the mounting surface within the light fixture, the LED assembly having a plurality of LEDs disposed thereon and oriented to radiate light energy directly through the illumination opening;
   coupling the LED assembly to a power source;
   providing a lens having select diffusivity and transmissivity properties such that light energy from the LEDs transmitted substantially directly therethrough is sufficiently diffused to optically mask the LED light energy source such that bright spots are not observable therefrom;
   securing the lens across the illumination opening of the light fixture, the lens being disposed between the LED assembly and the surface to be illuminated; and
   wherein when power is provided to the LEDs, light radiates from the LEDs directly through the lens in a manner diffusing and optically masking the LED light energy.

2. The method of claim 1, wherein the lens has a transmissivity of greater than 50%.

3. The method of claim 2, wherein light transmitted through the lens from a 100 lumen LED disposed two inches from the lens will uniformly illuminate the lens.

4. The method of claim 1, wherein the lens has a thickness of on the order of 0.12 inches.

5. The method of claim 1 and further comprising:
   wherein the lens comprises a structural element of the light fixture; and
   securing the lens across the illumination opening of the light fixture provides structural support thereto.

6. The method of claim 1, wherein the LED assembly has a power supply integrally formed therein and adapted to be coupled to the power source.

7. The method of claim 6 and further comprising:
   using the power supply to provide pulse-width modulation for controlling the light intensity of the LEDs.

8. The method of claim 1, wherein if one LED of the plurality of LEDs fails, current to the other LEDs is increased to compensate for the failure.

9. The method of claim 1, wherein the LED assembly comprises a cradle and an LED printed wiring assembly.

10. The method of claim 1 and further comprising:
    providing the mounting surface with a plurality of engagement pegs protruding therefrom;
    providing the LED assembly with a cradle having a plurality of keyholes disposed therein; and
    wherein removably engaging the LED assembly to the mounting surface includes passing the engagement pegs through the cradle for interconnection therewith.

11. The method of claim 1, wherein optically masking the LED light energy comprises rendering outlines of the LEDs indistinguishable one from another through the lens.

12. The method of claim 1, wherein removably engaging the LED assembly to the mounting surface includes passing a plurality of spring-push rivets through the LED assembly and into the mounting surface.

13. The method of claim 1, wherein when power is provided to the LEDs, locations of the LEDs are not observable.

14. The method of claim 1 and further comprising:
    the LED assembly having a plurality of engagement features protruding from edges thereof; and
    wherein removably engaging the LED assembly to the mounting surface includes latching the engagement features against opposite sides of the mounting surface.

15. The method of claim 1, wherein the light fixture includes translucent end caps disposed on opposite sides thereof.

16. A method of lighting with light emitting diodes (LEDs) oriented to directly radiate light energy onto a surface to be illuminated without bright spots being observable therefrom, the method comprising:
    mounting a plurality of light fixture assemblies in an area to be illuminated, each light fixture comprising:
      an illumination opening oppositely disposed from a mounting surface for passing light energy therethrough;
      an LED assembly removably secured to the mounting surface, the LED assembly having a plurality of LEDs disposed thereon and oriented to radiate light energy directly through the illumination opening; and
      a lens removably secured across the illumination opening, the lens having select diffusivity and transmissivity properties such that light energy from the LEDs transmitted substantially directly therethrough is sufficiently diffused to optically mask the LED light energy source such that bright spots are not observable therefrom; and
    providing each light fixture with power, wherein when power is provided to the LEDs, light radiates from the LEDs directly through the lens in a manner diffusing and optically masking the LED light energy.

17. The method of claim 16, wherein when an LED assembly fails, power to other LED assemblies is increased to compensate for the failure.

18. The method of claim 16 and further comprising: dimming a light output of one LED assembly to substantially match an intensity level of light being outputted by other LED assemblies.

19. A method of lighting with light emitting diodes (LEDs) oriented to directly radiate light energy onto a surface to be illuminated without bright spots being observable therefrom, the method comprising:
- providing a light fixture having an illumination opening oppositely disposed from a mounting surface for passing light energy therethrough;
- removably engaging an LED assembly to the mounting surface within the light fixture, the LED assembly having a plurality of LEDs disposed thereon and oriented to radiate light energy directly through the illumination opening;
- coupling the LED assembly to a power source;
- providing a lens having select diffusivity and transmissivity properties such that light energy from the LEDs transmitted therethrough is sufficiently diffused to optically mask the LED light energy source such that bright spots are not observable therefrom;
- securing the lens across the illumination opening of the light fixture, the lens being disposed between the LED assembly and the surface to be illuminated;
- wherein when power is provided to the LEDs, light radiates from the LEDs directly through the lens in a manner diffusing and optically masking the LED light energy; and
- wherein the lens has at least one of a transmissivity of greater than 50% and a thickness of on the order of 0.12 inches.

20. The method of claim 19, wherein light transmitted through the lens from a 100 lumen LED disposed two inches from the lens will uniformly illuminate the lens.

* * * * *